United States Patent [19]

Nilssen

[11] Patent Number: 4,700,287

[45] Date of Patent: Oct. 13, 1987

[54] DUAL-MODE INVERTER POWER SUPPLY

[76] Inventor: Ole K. Nilssen, Caesar Dr., Rt. 5, Barrington, Ill. 60010

[21] Appl. No.: 868,450

[22] Filed: May 30, 1986

[51] Int. Cl.[4] ............................................ H02M 7/537

[52] U.S. Cl. .................................... 363/132; 315/102; 315/DIG. 7

[58] Field of Search ...................... 363/71, 97, 98, 132; 307/29; 315/DIG. 5, 102, DIG. 7

[56] References Cited

U.S. PATENT DOCUMENTS

| | | | |
|---|---|---|---|
| 4,256,992 | 3/1981 | Luursema | 315/DIG. 7 |
| 4,408,270 | 10/1983 | Anderson et al. | 363/132 |
| 4,438,372 | 3/1984 | Zuchtriegel | 315/224 |
| 4,485,434 | 11/1984 | Beeston et al. | 363/132 |
| 4,506,318 | 3/1985 | Nilssen | 363/132 |
| 4,513,364 | 4/1985 | Nilssen | 363/132 |
| 4,520,255 | 5/1985 | Bredenlcamp et al. | 363/132 X |

*Primary Examiner*—Patrick R. Salce
*Assistant Examiner*—Marc S. Hoff

[57] ABSTRACT

A full-bridge inverter comprises two pairs of switching transistors and is conditionally operable to self-oscillate in either of two modes: a first mode wherein one of the two pairs of switching transistors self-oscillates in manner of a half-bridge inverter and powers a first load, and a second mode wherein both pairs of transistors self-oscillate in manner of a full-bridge inverter and then powers a second load in addition to the first load.

Such a dual-mode inverter has utility in situations where a load has to be pre-conditioned with a relatively small amount of conditioning power (such as cathode heating power) before being ready to absorb its main operating power. Typical examples of such loads are magnetrons and fluorescent lamps.

10 Claims, 1 Drawing Figure

DUAL-MODE INVERTER POWER SUPPLY

BACKGROUND OF THE INVENTION

1. Field of Invention

The present invention relates to full-bridge inverter power supplies, particularly of a type that is capable of operating in two modes.

2. Prior Art

Various loads, such as magnetrons or fluorescent lamps, require some form of pre-conditioning (such as the heating of a thermionic catahode) prior to being able to operate properly as a load. When, as frequently is desirable to do, such a load is powered by way of being effectively parallel-connected with the tank capacitor of a high-Q resonant circuit that is series-excited by the voltage output of an inverter power supply, a problem arises: before the load is operative to absorb power, the high-Q resonant circuit is effectively unloaded and it therefore represents an effective short circuit across the inverter's voltage output. This not only causes an excessively large power drain from the inverter, but also causes excessively large-magnitude voltages to develop across the circuit elements of the resonant circuit.

One way of circumventing this problem is that of providing the requisite pre-conditioning power from a separate source of power, and to delay the turning-on of the inverter power supply until after the load is properly conditioned. However, this approach requires the use of an extra power supply, and is therefore not as cost-effective as might be desired.

SUMMARY OF THE INVENTION

Objects of the Invention

An object of the present invention is that of providing an inverter having two modes of operation: one in which it is operative to power a first load, and one in which it is operative to power a second load in addition to the first load.

Another object is that of providing a cost-effective power supply operative to power a load that is parallel-connected with a series-excited high-Q resonant L-C circuit, and wherein the load requires conditioning prior to being able to operate properly as a load.

This, as well as other objects, features and advantages of the present invention will become apparent from the following description and claims.

Brief Description

A full-bridge inverter comprises a first and a second pair of series-connected switching transistors connected across a source of DC voltage. The inverter is conditionally operable to self-oscillate in either of two modes: a first mode wherein the first pair of switching transistors self-oscillates in manner of a half-bridge inverter and powers a first load, and a second mode wherein both pairs of transistors self-oscillate in manner of a full-bridge inverter and then powers a second load in addition to the first load.

The inverter's self-oscillatlion is accomplished by way of positive current feedback using saturable current transformers connected in circuit with the loads. The first load is connected between the center-junction of the first pair of series-connected transistors and the center-junction of two series-connected capacitors connected across the DC source. The second load is connected between the center-junctions of the two pairs of series-connected transistors.

The inverter is of such nature as to have to be triggered into oscillation. By triggering one of the transistors in the first pair of transistors, that first pair of transistors starts self-oscillating action and operates as a half-bridge inverter in combination with the series-connected capacitors. The other pair of series-connected transistors remains non-conductive and non-active until one of its transistors is properly triggered, after which point both pairs of transistors oscillate synchronously in ordinary bridge manner.

In the preferred embodiment, the first load amounts to only about 2 Watt and consists of the thermionic cathodes of a fluorescent lamp. The second load amounts to about 40 Watt and consists of the main gas discharge path of the fluorescent lamp. This main gas discharge path is connected across the tank capacitor in a series-connected L-C circuit; which series-connected L-C circuit is resonant at the inverter's oscillating frequency and connected directly between the center-junctions of the two pairs of transistors.

As long as the first load requires but a modest amount of power compared with that of the second load, the total power-handling capability of the dual-mode inverter is effectively determined by the sum total power-handling capabilities of all the four transistors.

DESCRIPTION OF THE PREFERRED EMBODIMENT

Details of Construction

Figure 1:
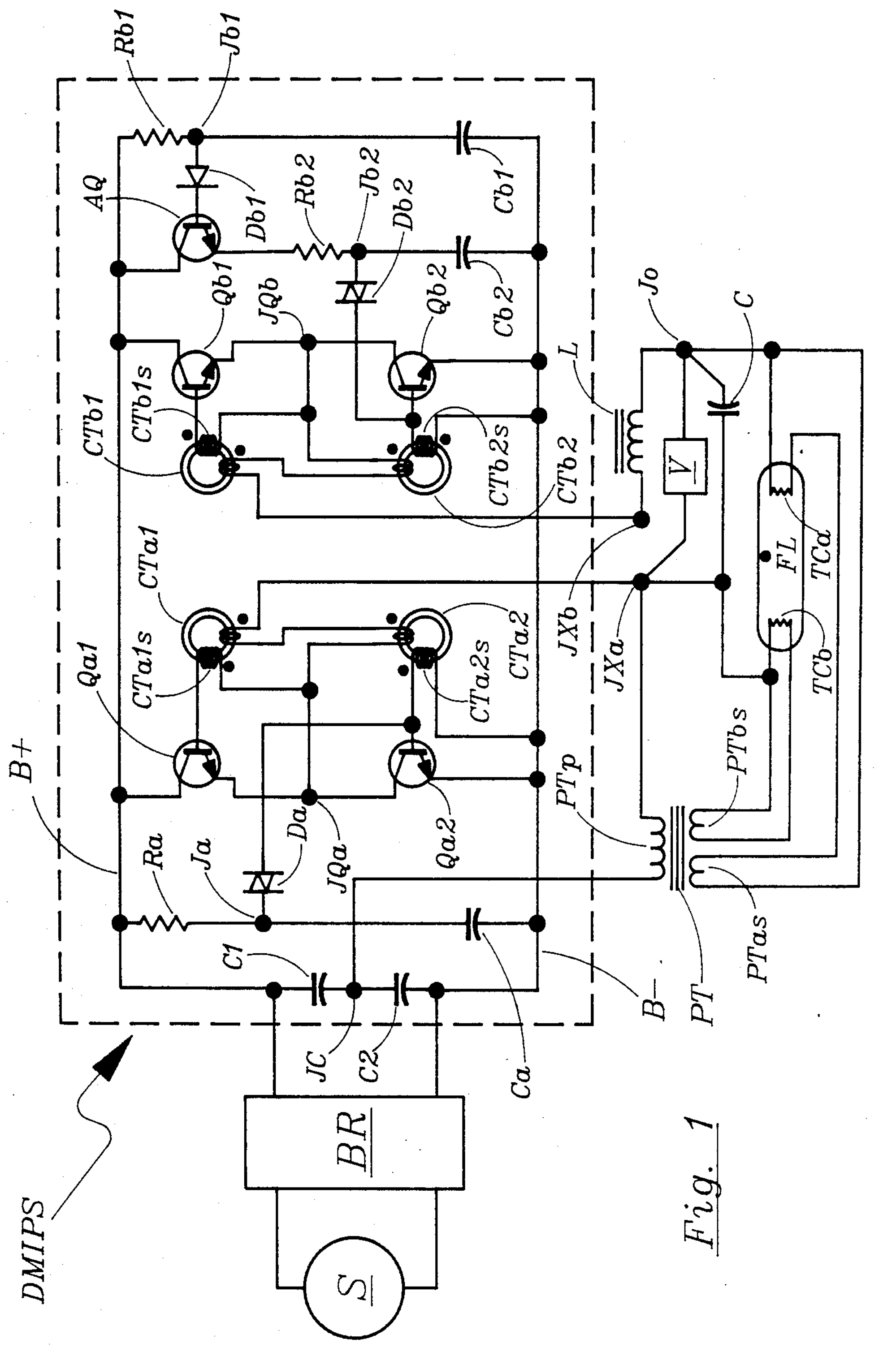
FIG. 1 provides a schematic diagram of the electrical circuitry of the preferred embodiment of the invention.

FIG. 1 shows a source of voltage S, which represents an ordinary 120 Volt/60 Hz electric utility power line. Connected across the output terminals of S, by way of a bridge rectifier BR, is a dual-mode inverter power supply DMIPS. The positive and negative output terminals of bridge rectifier BR provide a DC voltage between a B+ bus and a B− bus, respectively.

The first capacitor C1 is connected between the B+ bus and a junction JC; a second capacitor C2 is connected between junction JC and the B− bus.

The collector of a first transistor Qa1 is connected with the B+ bus; and the emitter of this same transistor is connected with a junction JQa. The collector of a second transistor Qa2 is connected with junction JQa; and the emitter of this same transistor is connected with the B− bus.

The collector of another first transistor Qb1 is connected with the B+ bus; and the emitter of this same transistor is connected with a junction JQb. The collector of another second transistor Qb2 is connected with junction JQb; and the emitter of this same transistor is connected with the B− bus.

The terminals of a secondary winding CTa1s of a first current transformer CTa1 are connected between the base and emitter of transistor Qa1; and the terminals of a secondary winding CTa2s of a second current transformer CTa2 is connected between base and emitter of transistor Qa2.

The terminals of a secondary winding CTb1s of another first current transformer CTb1 are connected between the base and emitter of transistor Qb1; and the terminals of a secondary winding CTb2s of another second current transformer CTb2 is connected between base and emitter of transistor Qb2.

The primary windings of current transformers CTa1 and CTa2 are connected in series between a junction JXa and junction JQa; and the primary windings of current transformers CTb1 and CTb2 are connected in series between a junction JXb and junction JQb.

The terminals of a primary winding PTp of a power transformer PT are connected between junctions JXa and JC. The terminals of a first secondary winding PTas of power transformer PT are connected with the terminals of a first thermionic cathode TCa of fluorescent lamp FL; and the terminals of a second secondary winding PTbs of power transformer PT are connected with the terminals of a second thermionic cathode TCb of fluoroescent lamp FL.

A resistor Ra is connected between the B+ bus and a junction Ja. A caacitor Ca is connected between junction Ja and the B− bus. A Diac Da is connected between junction Ja and the base of transistor Qa2.

A resistor Rb1 is connected between the B+ bus and a junction Jb1. A capacitor Cb1 is connected between junction Jb1 and the B− bus. A diode Db1 is connected with its anode to junction Jb1 and with its cathode to the base of an auxiliary transistor AQ. The collector of auxiliary transistor AQ is connected with B+ bus; and the emitter of auxiliary transistor AQ is connected with a junction Jb2 by way of a resistor Rb2. A capacitor Cb2 is connected between junction Jb2 and the B− bus; and a Diac Db2 is connected between junction Jb2 and the base of transistor Qb2.

An inductor L is connected between junction JXB and a junction Jo; and a capacitor C is connected between junction Jo and junction JXa. Thermionic cathode TCa of fluorescent lamp FL is connected with junction Jo; and thermionic cathode TCb of fluorescent lamp FL is connected with junction JXa. A Varistor V is connected between junctions JXa and Jo.

The assembly principally consisting of transistors Qa1 and Qa2 and current transformers CTa1 and CTa2 is referred to as the first half-bridge inverter. The assembly principally consisting of transistors Qb1 and Qb2 and current transformers CTb1 and CTb2 is referred to as the second half-bridge inverter. The B+ bus and the B− bus—as well as junction JC, which effectively constitutes a center-tap for theDC-supply—are common to the two half-bridge inverters.

Details of Operation

The operation of the dual-mode self-oscillating inverter circuit of FIG. 1 is explained as follows.

Within a few milli-seconds after power is applied to dual-mode inverter power supply DMIPS, trigger pulses start being provided to the base of transistor Qa2 by way of the trigger circuit consisting of resistor Ra, capacitor Ca and Diac Da. These trigger pulses initiate conduction of transistor Qa2; which, in turn, starts a cycle of positive feedback by way of saturable current transformers Qa1 and Qa2, thereby initiating the series-connected transistors Qa1 and Qa2—as combined with power transformer PT and center-tapped capacitors C1 and C2—into self-oscillation in manner of an ordinary half-bridge inverter; the operation of which is explained in detail in U.S. Pat. Nos. Re.31,758 and 4,506,318 to Nilssen.

However, some time after trigger pulses started to be provided to the base of transistor Qa1, trigger pulses start to be provided at the base of transistor Qb2 as well; which means that transistor-pair Qb1/Qb2 starts to get involved in the positive feedback cycle and thereby in the inverter action. Thus, from that point and forward, a 30 kHz squarewave output voltage is provided between junctions JXa and JXb. Of course, the output voltage between JXa and JC remains substantially unaffected.

The time required before trigger pulses starts being provided to the base of transistor Qb2 depends on the time it takes to charge capacitor Cb1 to the point where the voltage across it reaches a maganitude high enough to cause auxiliary transistor AQ to start to conduct. Thus, by adjusting the capacitance value of Cb1 and/or the resistance value of Rb1, it is possible to select substantially any desirable amount of delay between the onset of oscillation of the half-bridge inverter consisting of transistors Qa1/Qa2, capacitors C1/C2 and power transformer PT, and the onset of oscillation of lthe full-bridge inverter consisting of transistors Qa1/Qa2, Qb1/Qb2 and the main load circuit consisting of the resonant L-C circuit and fluorescent lamp FL.

For the preferred embodiment of FIG. 1, the delay time was chosen to be about 1.5 seconds; which represents the length of time it takes for thermionic cathodes TCa and TCb to reach full thermionic emission.

Additional Comments (a) For more information in respect to the operation of a full-bridge self-oscillating inverter, reference is made to U.S. Pat. No. 4,502,107 to Nilssen.

(b) For detailed information in respect to the operation of a series-excited L-C circuit powering a gas discharge lamp, reference is made to U.S. Pat. No. 4,538,095 to Nilssen.

(c) The four saturable current transformers CTa1, CTa2, CTb1 and CTb2 are all substantially identical in construction.

(d) By placing a control transistor in shunt across the base-emitter junction of transistor Qb2, the oscillatiaon of the full-bridge inverter can be controlled OFF and ON (i.e., stopped and started) by causing that transistor to constitute a substantial short circuit or a substantial open circuit, respectively. The control input would be the base of the control transistor. Of course, even if the full-bridge oscillation were to be disabled in this manner, the half-bridge oscillation would continue unaffectedly.

(e) The full-bridge inverter of FIG. 1 actually consists of two half-bridge inverters, either of which can be made to operate independently of the other, as long as the other is maintained in a non-operative state. When both half-bridge inverters oscillate, they are bound by their common feedback current to operate in synchronism and out-or-phase with one another. If required, some other load may be connected between the JXb/JC junctions—in direct correspondence with the load (namely power transformer PT) connected between the JXa/JC junctions.

In other words, the JC junction constitutes a common output terminal for the two half-bridge inverters. Thus, the output from the one half-bridge inverter is from junction JXa with respect to the common terminal JC; and the output from the other half-bridge inverter is from junction JXb with respect to the same common terminal JC.

When both half-bridge inverters are in operation, the output from the then resulting full-bridge inverter is simply between junction JXa and JXb—with the common terminal JC only being operative to provide a return path for any unbalanced AC in the total load. (Of course, such unbalanced AC would result from any load connected with power transformer PT.)

(f) It is believed that the present invention and its several attendant advantages and features will be understood from the preceeding description. However, without department from the spirit of the invention, changes may be made in its form and in the construction and interrelationships of its component parts, the form herein presented merely representing the presently preferred embodiment.

I claim:

1. An inverter power supply comprising:

DC terminals adapted to connect with a source of DC voltage;

first inverter means connected in circuit with the DC terminals and operative, whenever the DC terminals are connected with the source of DC voltage, to provide a first AC voltage across a first set of AC output terminals;

first connect means operative to permit connection of a first load means with the first set of AC output terminals;

second inverter means connected in circuit with the DC terminals and operative after the provision of an initiating action to an initiating input means, whenever the DC terminals are connected with the source of DC voltage, to provide a second AC voltage at a second set of AC output terminals;

second connect means operative to permit connection of a second load means in circuit with both the first set and the second set of AC output terminals, thereby to permit the provision of power to the second load means from both sets of AC output terminals, but only after the provision of the initiating action, the second load means receiving no power prior to the initiating action;

power to the first load means being provided irrespective of any power being provided to the second load means.

2. An inverter power supply comprising:

a DC source;

first inverter means connected with the DC source and operative to provide a first AC voltage across a first set of AC output terminals;

first connect means operative to permit connection of a first load means with the first set of AC output terminals;

second inverter means connected with the DC source and operative, but only after the provision of an initiating action at an initiating input means, to provide a second AC voltage at a second set of AC output terminals;

second connect means operative to permit connection of a second load means in circuit with both the first set and the second set of AC output terminals, thereby to permit the provision of power to the second load means from both sets of AC output terminals, but only after the provision of the initiating action, the second load means receiving no power prior to the initiating action;

power to the first load means being provided irrespective of any power being provided to the second load means.

3. The power supply of claim 2 wherein the first inverter means comprises a first half-bridge inverter.

4. The power supply of claim 3 wherein: (i) the second inverter means comprises a second half-bridge inverter, and (ii) the first half-bridge inverter is capable of inverter operation independent of the second half-bridge inverter.

5. A power supply comprising:

a first inverter connected with a source of DC and operative to provide an AC voltage at a first set of output terminals;

a second inverter connected with a source of DC and operative, but only after having received an initiating action at a control input, to provide an AC voltage at a second set of output terminals;

means connected with the control input and operative controllably to provide the initiating action; and connect means operative to connect a first load means with the first set of output terminals and a second load means with both the first and the second set of output terminals;

whereby the first load means receives power from the first inverter only, while the second load means receives power only after the second inverter has received the initiating action, and then it receives power in about equal amounts from both inverters.

6. A power supply comprising:

first inverter means connected with a source of DC and operative to provide an AC voltage at a first set of output terminals;

second inverter means connected with a source of DC and operative to controllably provide an AC voltage at a second set of output terminals; and connect means operative to connect a first load means with the first set of output terminals and a second load means with both the first and the second set of output terminals;

whereby the first load means receives power from the first inverter means only, while the second load means receives power only when the second inverter means provides an AC voltage at the second set of output terminals, but then it receives power in about equal amounts from both inverter means.

7. The power supply of claim 6 wherein the second inverter means is capable of self-oscillation.

8. A dual-mode inverter connected with a source of DC voltage and comprising:

a first half-bridge inverter connected with the DC voltage and conditionally operative to provide a first AC voltage at a first set of output terminals;

a second half-bridge inverter connected with the DC voltage and operative to provide a second AC voltage at a second set of output terminals, this second half-bridge inverter being capable of inverter operation independent of the state of operation of the first half-bridge inverter; and first load means connected with both sets of output terminals and second load means connected with the second set of output terminals;

such that, when both half-bridge inverters are engaged in inverter operation, they operate jointly in the form of a full-bridge inverter and provide power to both the first as well as to the second load means, but when only the second half-bridge is engaged in inverter operation, it operates in the manner of a single half-bridge inverter and provides power only to the second load means.

9. The inverter of claim 8 combined with means for controlling the operation of the first half-bridge inverter.

10. The inverter of claim 8 wherein both half-bridge inverters are of the self-oscillating type.

* * * * *